(12) United States Patent
Tsui et al.

(10) Patent No.: US 8,780,090 B2
(45) Date of Patent: Jul. 15, 2014

(54) HANDHELD ELECTRONIC DEVICE AND EXECUTING APPLICATION METHOD

(71) Applicant: HTC Corporation, Taoyuan (TW)

(72) Inventors: Yuan-Mao Tsui, Taoyuan (TW); Hok-sum H Luke, Taoyuan (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 0 days.

(21) Appl. No.: 13/908,007

(22) Filed: Jun. 3, 2013

(65) Prior Publication Data

US 2013/0271432 A1    Oct. 17, 2013

Related U.S. Application Data

(63) Continuation of application No. 12/404,378, filed on Mar. 16, 2009, now Pat. No. 8,471,833.

(30) Foreign Application Priority Data

May 2, 2008    (TW) .................................. 97116329

(51) Int. Cl.
*G06F 3/0354*    (2013.01)

(52) U.S. Cl.
USPC ......................................................... 345/179

(58) Field of Classification Search
None
See application file for complete search history.

(56) References Cited

U.S. PATENT DOCUMENTS

| 6,573,844 | B1* | 6/2003 | Venolia et al. ................... 341/22 |
| 2002/0173345 | A1 | 11/2002 | Swerup et al. |
| 2003/0069039 | A1 | 4/2003 | Lin et al. |
| 2004/0108997 | A1 | 6/2004 | Lee |
| 2004/0263493 | A1 | 12/2004 | Yueh |
| 2008/0036747 | A1* | 2/2008 | Hope ............................. 345/179 |
| 2009/0278805 | A1 | 11/2009 | Kao et al. |

FOREIGN PATENT DOCUMENTS

| CN | 2512034 | 9/2002 |
| CN | 1508711 | 6/2004 |
| CN | 1913684 A | 2/2007 |
| CN | 201000588 Y | 1/2008 |
| CN | 201021993 Y | 2/2008 |
| CN | 1725785 | 1/2011 |
| TW | 200410074 | 12/2004 |

OTHER PUBLICATIONS

Chinese language office action dated Jul. 21, 2011.
English language translation of abstract of CN 2512034 (published Sep. 18, 2002).
English language translation of abstract of CN 1725785 (published Jan. 25, 2011).
Chinese language office action dated May 16, 2012.

(Continued)

*Primary Examiner* — Joseph Haley
*Assistant Examiner* — Emily Frank
(74) *Attorney, Agent, or Firm* — McClure, Qualey & Rodack, LLP

(57) ABSTRACT

An application executing method is provided. The application executing method is applied to a handheld electronic device having a body and a touch element. The touch element is disposed at the body. The application executing method comprises the following steps. Firstly, a communication mode is entered. Next, whether the touch element is moved is detected. If the touch element is moved, then an application is activated.

16 Claims, 3 Drawing Sheets

(56) References Cited

OTHER PUBLICATIONS

English language translation of abstract of CN1508711 (published Jun. 30, 2004).
TW Office Action dated Nov. 21, 2013.
English Abstract translation for CN1913684A (Published Feb. 14, 2007).
English Abstract translation for CN201021993Y (Published Feb. 13, 2008).
English Abstract translation for CN201000588Y (Published Jan. 2, 2008).
CN Office Action dated Feb. 24, 2014.

* cited by examiner

HANDHELD ELECTRONIC DEVICE AND EXECUTING APPLICATION METHOD

CROSS REFERENCE TO RELATED APPLICATIONS

This application is a continuation application of co-pending application Ser. No. 12/404,378, filed Mar. 16, 2009 and entitled "HANDHELD ELECTRONIC DEVICE, EXECUTING APPLICATION METHOD, AND DIGITAL DATA STORAGE MEDIA", which claims the benefit of Taiwan application Serial No. 97116329, filed May 2, 2008. These related applications are incorporated herein by reference.

BACKGROUND OF THE APPLICATION

As handheld electronic devices such as touch phone and personal digital assistant (PDA) phone have gained great popularity and rapid advance, manufacturers are dedicated to the attempt of integrating various functions in the same handheld electronic device to meet consumers' versatile needs.

For example, when the user makes a phone call with a PDA (personal digital assistant) phone, the user may need to take down the content of the talk during the call such as a telephone number or an address provided by the other party. By integrating a notepad application into the PDA phone, the user is able to take down the content of the talk during the call. Besides, PDA phone normally has a stylus with which the user can easily operate the PDA phone. If the use needs to activate the notepad application while making a phone call with a current PDA phone, the user has access many paths and menus to select and activate the notepad application, and thus which is inconvenient for the user and causes the other party to wait over a long time.

SUMMARY OF THE APPLICATION

The application is directed to a handheld electronic device, an application executing method, and a digital storage medium. When a touch element is moved under a communication mode, which implies that the user would like to operate an application with the touch element, the application is executed. Thus, the user has better efficiency in activating an application.

According to a first aspect of the present application, a handheld electronic device is provided. The device comprises a body, a touch element, a communication module, a detection unit, and a processing unit. The touch element is disposed at the body. The communication module is for the device to enter a communication mode. The detection module is coupled to the communication module for determining whether the touch element is moved under a communication mode. The processing unit is coupled to the detection unit. If the touch element is moved under a communication mode, then the processing unit activates an application.

According to a second aspect of the present application, an application executing method is provided. The application executing method is applied to a handheld electronic device having a body and a touch element. The touch element is disposed at the body. The application executing method comprises the following steps. Firstly, a communication mode is entered. Next, whether the movement of the touch element is detected. If the touch element is moved, then an application is activated.

According to a third aspect of the present application, a digital storage medium is provided. The digital storage medium has many commands executable on a handheld electronic device, and the handheld electronic device executes an application executing method after executing these commands. The handheld electronic device comprises a body and a touch element. The touch element is disposed at the body. The application executing method comprises the following steps. Firstly, a communication mode is entered. Next, whether the movement of the touch element is detected. If the touch element is moved, then an application is activated.

The application will become apparent from the following detailed description of the preferred but non-limiting embodiments. The following description is made with reference to the accompanying drawings.

DETAILED DESCRIPTION OF THE APPLICATION

Figure 1:
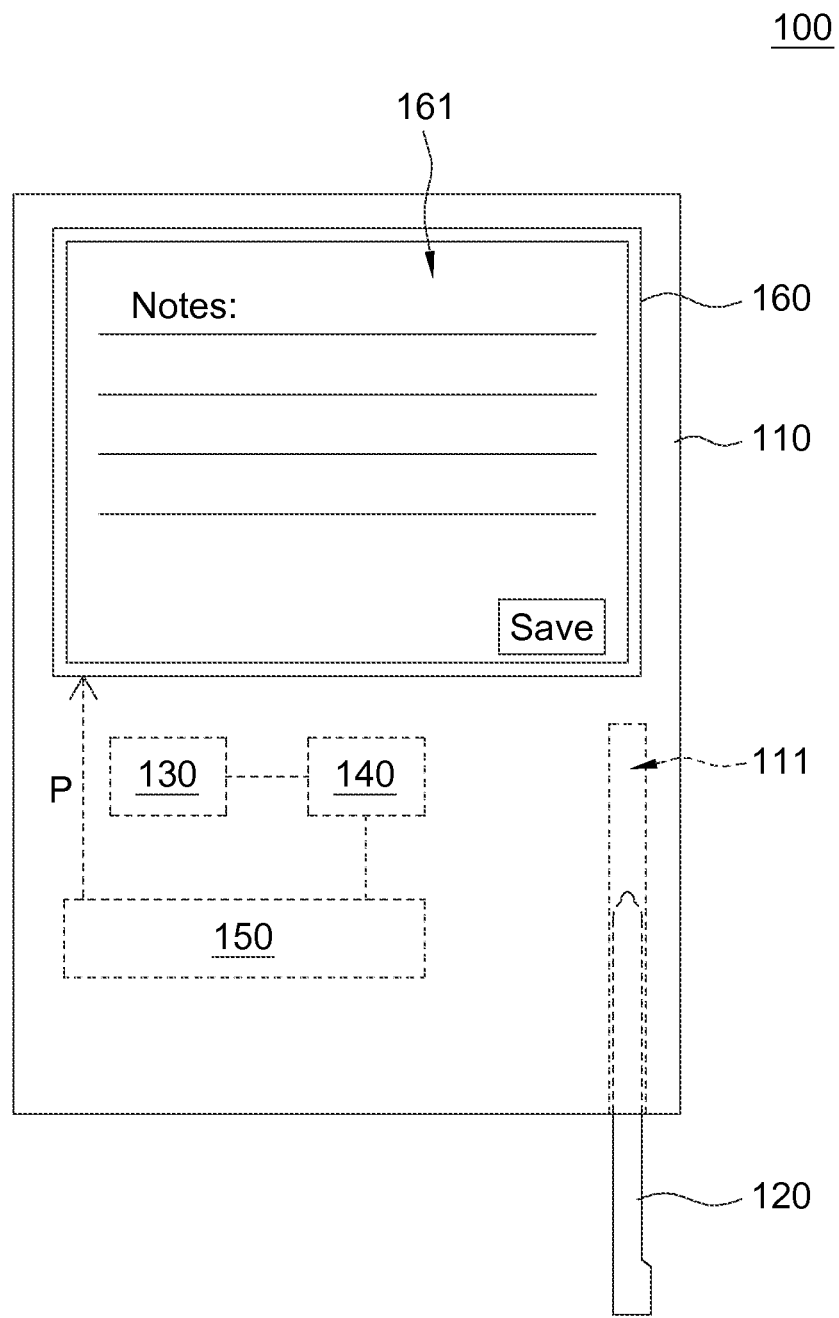
FIG. 1 shows a handheld electronic device according to a preferred embodiment of the application.

Referring to FIG. 1, a handheld electronic device according to an embodiment of the application is shown. The handheld electronic device 100, such as a touch phone or a personal digital assistant (PDA) phone, comprises a body 110, a touch element, a communication module 130, a detection unit 140, and a processing unit 150.

In the present embodiment of the application, the touch element is exemplified by a stylus 120. The stylus 120 is disposed at the body 110 by way of being inserted into a slot 111 of the handheld electronic device 100. The communication module 130 is for entering a communication mode. The detection unit 140 is coupled to the communication module 130 and the processing unit 150 for determining whether the stylus 120 is moved under a communication mode. If the detection unit 140 detects that the stylus 120 is moved under a communication mode, the processing unit 150 activates an application P such as a notepad application.

Generally speaking, when the user moves the stylus 120 under a communication mode, which implies that the user would like to operate the application P with the stylus 120. For example, the user may take down the content of the talk during the call with the stylus 120 in the notepad application. In the present embodiment of the application, when the stylus 120 is moved under a communication mode, the application P is automatically activated. Thus, there is no need to activate the application P by accessing many paths and menus to active the application P after the stylus 120 is moved in a communication mode. Therefore, the efficiency of activating the application P is increased, user convenience is improved, and product competiveness is enhanced.

Figure 2:
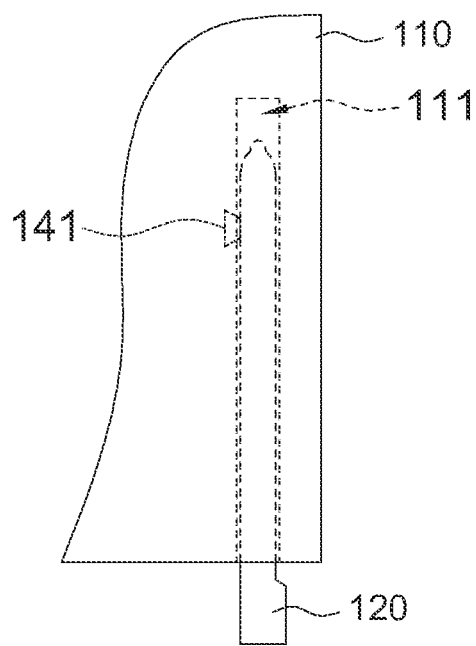
FIG. 2 shows a partial enlargement of the handheld electronic device of FIG. 1 including a switch.

In an embodiment of the application, the detection unit 140 detects whether the stylus 120 is moved according to whether the stylus 120 is removed from the slot 111. The detection element 140 detects whether the stylus 120 is removed from the slot 111 by a switch or a capacitance sensor of the handheld electronic device 100. Referring to FIG. 2, a partial enlargement of the handheld electronic device of FIG. 1 including a switch is shown. The switch 141 is disposed at one side of the slot 111 and is electrically connected to the body 110. When the stylus 120 is inserted into the slot 111, the stylus 120 presses the switch 141 and pushes the switch 141 into the body 110. When the stylus 120 is removed from the slot 111, the stylus 120 releases the switch 141. The detection unit 140 detects whether the stylus 120 is removed from the slot 111 according to whether the switch 141 is released. When the detection unit 140 detects that the switch 141 is released, which implies that the stylus 120 is removed from the slot 111, the processing unit 120 activates the application P.

Figure 3:
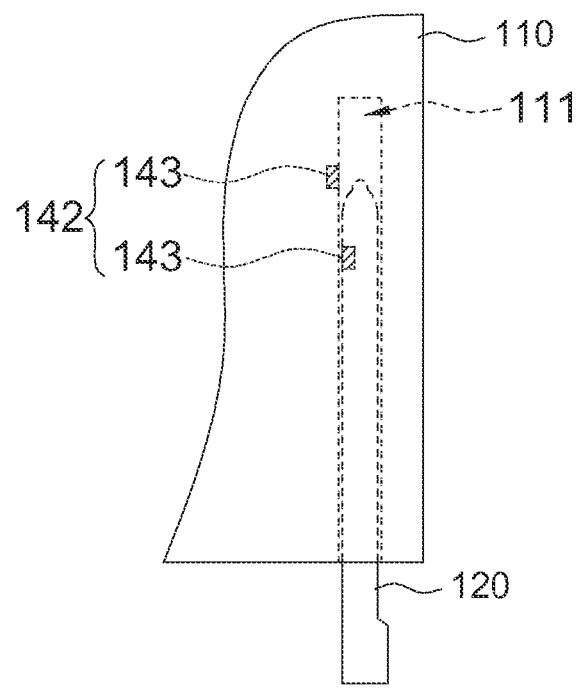
FIG. 3 shows a partial enlargement of the handheld electronic device of FIG. 1 including a capacitance sensor.

Referring to FIG. 3, a partial enlargement of the handheld electronic device 100 of FIG. 1 including a capacitance sensor 142 is shown. The capacitance sensor 142 comprises two metal conductors 143 and 144 respectively disposed on a side of the slot 111 and on a side the stylus 120. The two metal conductors 143 and 144 are disposed in the manner that when the stylus 120 is removed, the two metal conductors 143 and 144 move towards each other and then depart away from each other gradually, or the two metal conductors 143 and 144 contact to each other firstly and then depart, such that the charges of the metal conductors 143 and 144 would change. The detection unit 120 detects whether the stylus 120 is removed from the slot 111 according to the change in the charges of the metal conductor 143 or 144.

In one embodiment of the application, the detection unit 140 repeatedly detects whether the stylus 120 is removed from the slot 111 under a communication mode. Moreover, the communication module 130 receives or sends a call Ca request so as to enter a communication mode. The handheld electronic device 100 further comprises a touch screen 160. The touch screen 160 is coupled to the processing unit 150. When the stylus 120 is removed from the slot 111 under a communication mode, the processing unit 150 activates an application P and shows an input interface 161 of the application P on the touch screen 160. The input interface 161 is for the user to input a data Dt with the stylus 120. The data Dt is saved with regard to the call Ca, for example, the call history of the call Ca. Thus, the user can view the data Dt by clicking relevant records of the call Ca from the call history.

Furthermore, after the detection unit 140 detects the movement of the stylus 120 under a communication mode, the detection unit 140 further detects whether the stylus 120 is moved to the initial position. If the detection unit 140 detects that the stylus 120 is moved to the initial position, the processing unit 140 closes the application P. For example, after the detection unit 140 detects that the stylus 120 is removed from the slot 111 under a communication mode, the processing unit 140 activates the application P. If the detection unit 140 detects that the stylus 120 is inserted into the slot 111 again, then the processing unit 140 closes the application P. Thus, after the user put the stylus 120 into the initial position, the application P will be automatically closed. In another embodiment, the processing unit 140 shows a window on the touch screen 160 to enquire the user whether to close the application P. In yet another embodiment, if the user has not stored the inputted data Dt when put the stylus into the initial position, then the processing unit 140 shows a window the touch screen 160 to enquire the user whether to store the data Dt before closing the application P.

Furthermore, in another embodiment of the application, when the stylus 120 is moved and the application P is activated, the operating mode of the handheld electronic device 100 is changed to a speakerphone mode, i.e. the speakerphone of the handheld electronic device 100 is turned on.

In the present embodiment of the application, the stylus 120 of the touch element is disposed at the body 110 of the handheld electronic device 100. In other embodiments, the touch element can be disposed outside the body 110 of the handheld electronic device 100 and connected to the handheld electronic device 100.

Figure 4:
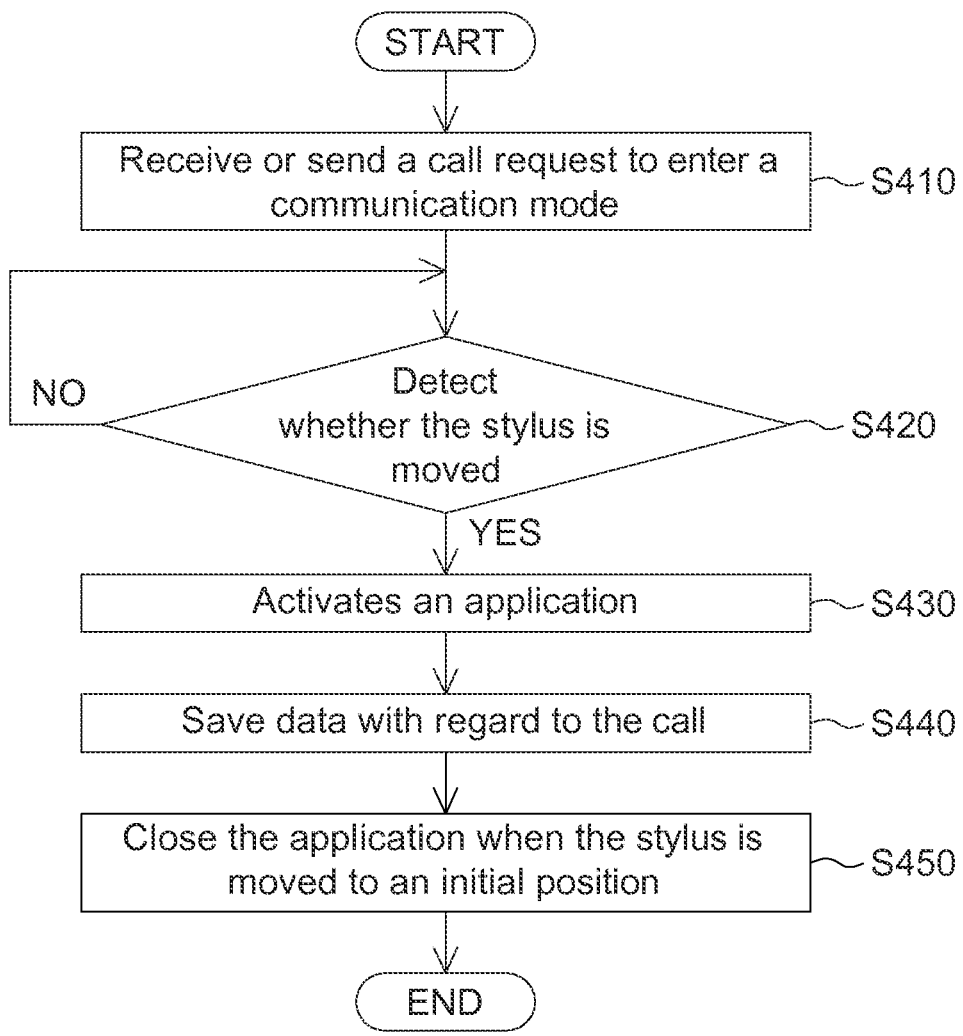
FIG. 4 shows a flowchart of an application executing method according to a preferred embodiment of the application.

Referring to FIG. 4, a flowchart of an application executing method according to an embodiment of the application is shown. The application executing method of the present embodiment of the application employs the handheld electronic device 100 of FIG. 1 to implement each step of FIG. 4. However, the application is not limited thereto. Anyone who is skilled in the technology of the application will understand that the steps and order of the application executing method may be adjusted or modified to fit actual needs.

Firstly, the method begins at step S410, the communication module 130 receives or sends a call Ca request to enter a communication mode. Next, the method proceeds to step S420, the detection unit 140 detects whether the stylus 120 is moved. If the detection unit 140 detects that the stylus 120 is moved, then the method proceeds to step S430. IF the detection unit 140 detects that the stylus 120 is not moved, then the step S420 is repeated to detect whether the stylus 120 is moved.

In step S420, the detection unit 140 detects whether the stylus 120 is moved according to whether the stylus 120 is moved from the slot 111. In one embodiment of the application, the detection unit 140 detects whether the stylus 120 is removed from the slot 111 according to whether the switch 141 is released. In another embodiment of the application, the detection unit 140 may detects whether the stylus 120 is removed from the slot 111 according to the change in the charges of the metal conductor 143 or 144.

As indicated in step S430, the processing unit 150 activates an application P, for example a notepad application. In an embodiment of the application, the processing unit 150 activates the application P and shows an input interface 161 on the touch screen 160 for the user to input a data Dt. Furthermore, in another embodiment of the application, the processing unit 150 changes the operating mode of the handheld electronic device 100 to a speakerphone mode, i.e. the processing unit 150 turns the speakerphone of the handheld electronic device 100 on. Then, the method proceeds to step S440, the data Dt is saved with regard to the call history of the call Ca. Afterwards, the method proceeds to step S450, when the detection element 140 detects that the stylus 120 is moved to the initial position, the processing unit 120 closes the application P.

The above application executing method may be programmed and stored in a digital data storage medium executable on the handheld electronic device 100. The digital data storage medium, such as secure digital (SD) card, memory stick (MS) and multimedia memory card (MMC), has the above application executing function after the application executing method is executed on the handheld electronic device 100.

According to the handheld electronic device, the application executing method, and the digital storage medium disclosed in the above embodiments of the application, an application is automatically activated when the user removes a touch element under a communication mode. The touch element is a stylus and the application is a notepad application for example. Thus, the user can immediately input data to an input interface of the notepad application with the stylus without having to activate the notepad application manually, hence saving time, improving user convenience, and enhancing product competiveness. Besides, the data inputted by the user is saved with respect to the call history of the call. Thus, the user can view the data Dt by clicking relevant records of the call Ca from the call history. Also, after the user moves the stylus to the initial position, the application is automatically closed.

While the application has been described by way of example and in terms of embodiments, it is to be understood that the application is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A handheld electronic device, comprising:
 a body;
 a touch element disposed in the body;
 a detection unit detecting that the touch element is detachably moved in a communication mode and generating a first signal in response thereto; and
 a processing unit coupled to the detection unit and configured to activate a notepad application in the communication mode in response to the first signal.

2. The handheld electronic device according to claim 1, wherein the touch element is a stylus.

3. The handheld electronic device according to claim 2, further comprising:
 a slot, wherein the stylus is disposed in the body by way of being inserted into the slot.

4. The handheld electronic device according to claim 3, wherein the detection unit detects that the stylus is detachably moved in the slot to generate the first signal.

5. The handheld electronic device according to claim 4, wherein the detection unit is a switch disposed at one side of the slot;
 the switch is pressed when the stylus is inserted into the slot and released to generate the first signal when the stylus is detachably moved in the slot.

6. The handheld electronic device according to claim 1, further comprising a touch screen being coupled to the processing unit and being configured to show an input interface of the notepad application for inputting a data.

7. The handheld electronic device according to claim 6, wherein the data is saved with regard to a call history of a call.

8. The handheld electronic device according to claim 1, wherein the processing unit further changes an operating mode of the handheld electronic device to a speakerphone mode in response to the first signal.

9. An application executing method applied to a handheld electronic device in a communication mode, the handheld electronic device comprising a body and a touch element, the touch element being disposed at the body, the application executing method comprising:
 a. detecting that the touch element is detachably moved in the communication mode;
 b. generating a first signal in response to the detecting step; and
 c. activating a notepad application in the communication mode in response to the first signal.

10. The application executing method according to claim 9, wherein the touch element is a stylus.

11. The application executing method according to claim 10, wherein the handheld electronic device further comprises a slot, and the stylus is disposed in the body by way of being inserted into the slot, and the step a is a step of detecting that the stylus is detachably in the stylus to generate the first signal.

12. The application executing method according to claim 9, wherein the handheld electronic device comprises a touch screen being coupled to the processing unit, the application executing method further comprises a step of showing an input interface of the notepad application by the touch screen for inputting a data.

13. The application executing method according to claim 12, further comprising a step of saving data with regard to a call history of a call.

14. A handheld electronic device, comprising:
 a body;
 a touch element disposed in the body;
 a detection unit detecting that the touch element is detachably moved in a communication mode and generating a first signal in response thereto; and
 a processing unit coupled to the detection unit and configured to activate a notepad application in the communication mode in response to the first signal to show at least one note items.

15. A handheld electronic device, comprising:
 a body;
 a touch element disposed in the body;
 a detection unit detecting the touch element is detachably moved from an initial position in the communication mode to generate a signal; and
 a processing unit coupled to the detection unit and configured to activate a notepad application in response to the signal;
 wherein the detection unit further detects that the touch element is moved back to an initial position to generate a second signal after activating the notepad application; the processing unit closes the notepad application in response to the second signal.

16. An application executing method applied to a handheld electronic device, the handheld electronic device comprising a body and a touch element, the touch element being disposed at the body, the application executing method comprising:
 a. detecting the touch element is detachably moved;
 b. generating a first signal in response to the step a;
 c. activating a notepad application in response to the first signal;
 d. detecting that the touch element is moved back to an initial position;
 e. generating a second signal in response to the step d;
 f. closing the notepad application in response to the second signal.

* * * * *